(12) United States Patent
Korcz et al.

(10) Patent No.: US 12,166,336 B2
(45) Date of Patent: Dec. 10, 2024

(54) WIRE SUPPORT BRACKET

(71) Applicant: Hubbell Incorporated, Shelton, CT (US)

(72) Inventors: Krzysztof Korcz, Granger, IN (US); Steven Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 207 days.

(21) Appl. No.: 17/630,407

(22) PCT Filed: Jul. 31, 2020

(86) PCT No.: PCT/US2020/044657
§ 371 (c)(1),
(2) Date: Jan. 26, 2022

(87) PCT Pub. No.: WO2021/022230
PCT Pub. Date: Feb. 4, 2021

(65) Prior Publication Data
US 2022/0285926 A1  Sep. 8, 2022

Related U.S. Application Data

(60) Provisional application No. 62/881,054, filed on Jul. 31, 2019.

(51) Int. Cl.
*H02G 15/00* (2006.01)
*H02G 3/14* (2006.01)
(Continued)

(52) U.S. Cl.
CPC ............. *H02G 15/007* (2013.01); *H02G 3/14* (2013.01); *H02G 15/00* (2013.01); *H02G 3/085* (2013.01)

(58) Field of Classification Search
CPC ........ H02G 15/007; H02G 3/085; H02G 3/10; H02G 3/25; H02G 15/00
See application file for complete search history.

(56) References Cited

U.S. PATENT DOCUMENTS 1,288,024 A * 12/1918 Kendig ................. H02G 3/125
220/3.9
2,480,805 A * 8/1949 Buckels ................ H02G 3/125
248/219.4
(Continued)

FOREIGN PATENT DOCUMENTS

CN         105165131 A    12/2015
SU         1 729 659 A1    4/1992

OTHER PUBLICATIONS

PCT/US2020/044657 International Search Report and Written Opinion dated Oct. 15, 2020 (13 pages).
(Continued)

*Primary Examiner* — Nkeisha Smith
(74) *Attorney, Agent, or Firm* — Robinson + Cole LLP (57) ABSTRACT

A bracket is provided for supporting an electrical conductor extending through an aperture of an electrical box. The bracket includes a first portion configured to be coupled to an outer surface of the electrical box; and a second portion coupled to the first portion and pivotable relative to the first portion. The second portion includes a leg and a plurality of tabs, and the tabs are pivotable relative to the connecting portion.

20 Claims, 14 Drawing Sheets

(51) Int. Cl.
*H02G 15/007* (2006.01)
*H02G 3/08* (2006.01)

(56) References Cited

U.S. PATENT DOCUMENTS

| | | | | |
|---|---|---|---|---|
| 5,114,105 | A * | 5/1992 | Young | H02G 3/126 |
| | | | | 248/27.1 |
| 5,295,644 | A * | 3/1994 | Ferguson, Jr. | H02G 3/126 |
| | | | | 220/3.9 |
| 7,271,335 | B2 * | 9/2007 | Dinh | H02G 3/125 |
| | | | | 174/53 |
| 7,353,961 | B2 * | 4/2008 | Hull | H02G 3/085 |
| | | | | 220/254.1 |
| 8,042,776 | B2 * | 10/2011 | Johnson | H02G 3/126 |
| | | | | 248/220.21 |
| 8,138,418 | B2 * | 3/2012 | Santiago | H02G 3/12 |
| | | | | 439/535 |
| 8,424,827 | B2 * | 4/2013 | Dinh | H02G 3/081 |
| | | | | 220/3.9 |
| 8,746,633 | B1 * | 6/2014 | Medlin, Jr. | H02G 3/32 |
| | | | | 248/65 |
| 9,261,120 | B2 * | 2/2016 | Colangelo | H02G 3/125 |
| 9,444,236 | B2 * | 9/2016 | Witherbee | H02G 3/10 |
| 9,825,446 | B2 * | 11/2017 | Korcz | H02G 3/125 |
| 9,929,549 | B2 * | 3/2018 | Witherbee | F16M 13/022 |
| 10,084,296 | B2 * | 9/2018 | Korcz | H02G 3/083 |
| 10,851,937 | B2 * | 12/2020 | Johnson | F16M 13/02 |
| 10,923,895 | B2 * | 2/2021 | Korcz | H02G 3/16 |
| 11,047,510 | B2 * | 6/2021 | Juzak | B05B 15/62 |
| 11,248,721 | B2 * | 2/2022 | Oh | H02G 3/125 |
| 11,248,740 | B2 * | 2/2022 | Witherbee | H02G 3/126 |
| 11,473,721 | B2 * | 10/2022 | Oh | F16M 13/022 |
| 11,585,486 | B2 * | 2/2023 | Witherbee | F16M 13/022 |
| 2003/0182881 | A1 * | 10/2003 | Denier | H02G 1/00 |
| | | | | 52/489.1 |
| 2005/0067546 | A1 * | 3/2005 | Dinh | H02G 3/125 |
| | | | | 220/3.9 |
| 2008/0029287 | A1 * | 2/2008 | Korcz | H02G 3/126 |
| | | | | 174/58 |
| 2008/0128164 | A1 | 6/2008 | Johnson | |
| 2010/0000783 | A1 * | 1/2010 | Tally | H02G 1/00 |
| | | | | 174/505 |
| 2010/0025064 | A1 | 2/2010 | Nelson | |
| 2010/0108347 | A1 * | 5/2010 | Korcz | H02G 3/126 |
| | | | | 248/226.12 |
| 2014/0262420 | A1 | 9/2014 | Scanzillo et al. | |
| 2014/0262488 | A1 | 9/2014 | Korcz et al. | |
| 2016/0099555 | A1 * | 4/2016 | Nikayin | H02G 3/126 |
| | | | | 248/65 |
| 2016/0308342 | A1 * | 10/2016 | Witherbee | F16B 2/245 |
| 2019/0058315 | A1 | 2/2019 | Korcz et al. | |
| 2019/0376643 | A1 * | 12/2019 | Witherbee | H02G 3/10 |
| 2020/0378553 | A1 * | 12/2020 | Oh | H02G 3/125 |
| 2022/0030731 | A1 * | 1/2022 | Oh | H02G 3/125 |

OTHER PUBLICATIONS

The extended European search report issued on Jul. 18, 2023, by the European Patent Office in corresponding European Patent Application No. 20848368.5. (8 pages).

Communication pursuant to Rules 70(2) and 70a(2) EPC issued on Aug. 4, 2023, by the European Patent Office in corresponding European Patent Application No. 20848368.5. (1 page).

* cited by examiner

FIG. 14

WIRE SUPPORT BRACKET

REFERENCE TO RELATED APPLICATION

This application claims the benefit of prior-filed, co-pending U.S. Provisional Patent Application No. 62/881,054, filed Jul. 31, 2019, the entire contents of which are incorporated by reference.

FIELD

The present disclosure relates to a support bracket, and particularly to a bracket configured to be coupled to an electrical box for supporting electrical conductors.

SUMMARY

In one independent aspect, a bracket is provided for supporting an electrical conductor extending through an aperture of an electrical box. The bracket includes a first portion configured to be coupled to an outer surface of the electrical box; and a second portion coupled to the first portion and pivotable relative to the first portion. The second portion includes a leg and a plurality of tabs, and the tabs are pivotable relative to the connecting portion.

In some aspects, the second portion further includes a feature disposed between the connecting portion and the tabs. The feature allows the tabs to pivot relative to the connecting portion.

In some aspects, the plurality of tabs includes a plurality of first tabs, and each of the first tabs has a distal end configured to extend at least partially around an outer surface of the conductor.

In some aspects, the plurality of tabs includes a plurality of second tabs, and each of the second tabs is positioned between two adjacent first tabs.

In some aspects, the plurality of tabs includes a plurality of linear tabs pivotable relative to the connecting portion in an opposite direction than the second tabs and positioned between two adjacent conductors.

In some aspects, the bracket further includes an intermediate portion coupling the second portion for pivotable movement relative to the first portion.

In some aspects, the second portion further includes a feature disposed between the connecting portion and each of the tabs, and the feature allows the tab to pivot relative to the body.

In some aspects, the second portion includes a flange, the leg couples the flange to the first portion, and the tabs are supported on the flange in a cantilevered manner.

In some aspects, the second portion further includes an elongated opening extending through the flange, and the tabs are connected to an inner edge of the elongated opening and are pivotable relative to the inner edge.

In some aspects, the plurality of tabs includes a plurality of first tabs. Each of the first tabs has a distal end configured to extend at least partially around an outer surface of at least one of the conductors.

In some aspects, the plurality of tabs includes a plurality of second tabs, and each of the second tabs is positioned between two adjacent first tabs.

In some aspects, the plurality of first tabs includes at least one tab having a T-shape with two ends extending in opposite directions from one another. Each of the two ends engages an outer surface of an associated one of the conductors.

In some aspects, the plurality of tabs define a plurality of spaces. Each of the spaces is configured to receive an associated one of the conductors, and each of the spaces is substantially aligned with an opening formed in a side of the electrical box.

In some aspects, at least one of the first portion and the second portion includes a support bend positioned adjacent a terminal edge.

In another independent aspect, a bracket is provided for supporting an electrical conductor extending through an aperture of an electrical box. The bracket includes a first portion configured to be coupled to an outer surface of the electrical box; and a second portion coupled to the first portion and pivotable relative to the first portion. The second portion includes a flange, at least one leg coupling the flange to the first portion, and a plurality of tabs. The tabs are supported on the flange in a cantilevered manner.

In some aspects, the second portion further includes an elongated opening extending through the flange. The tabs are connected to an inner edge of the elongated opening and are pivotable relative to the inner edge.

In some aspects, the plurality of tabs includes a plurality of first tabs. Each of the first tabs has a distal end configured to extend at least partially around an outer surface of at least one of the conductors.

In some aspects, the plurality of tabs includes a plurality of second tabs. Each of the second tabs has a linear shape and is positioned between two adjacent first tabs.

In some aspects, the plurality of tabs includes at least one tab having a T-shape with two ends extending in opposite directions from one another. Each of the two ends engages an outer surface of an associated one of the conductors.

In some aspects, at least one of the first portion and the second portion includes a support bend positioned adjacent a terminal edge.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect.

In general, the present invention relates to a bracket for supporting electrical conductors. The bracket is connectable to an electrical box and may support electrical conductors passing into and/or out of the electrical box.

Figure 1:
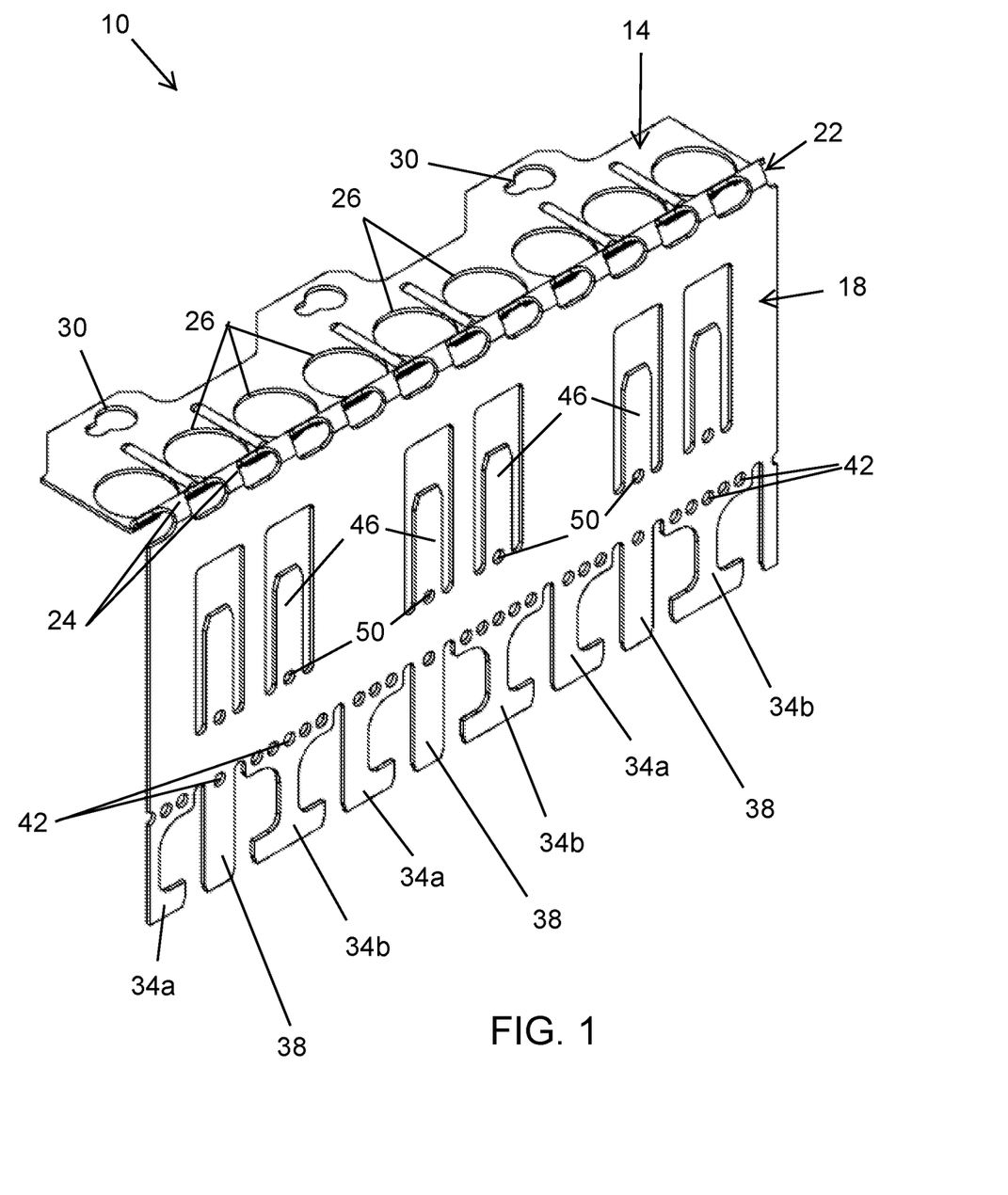
FIG. 1 is a perspective view of a bracket.

As shown in FIG. 1, a support bracket 10 includes a first portion 14 and a second portion 18 coupled to the first portion 14 (e.g., by an intermediate portion of hinge 22). In the illustrated embodiment, the first portion 14 and the second portion 18 have generally planar bodies. The hinge 22 includes a resilient portions 24 extending between the first and second portions 14, 18. In an unbiased position, the hinge 22 supports the second portion 18 generally orthogonally with respect to the first portion 14. The hinge 22 allows the first portion 14 to move relative to the second portion 18 so that the first portion 14 is oriented obliquely with respect to the second portion 18. In the illustrated embodiment, a user may bend the first portion 14 relative to the second portion 18 about the hinge 22, and the hinge 22 can retain the first and second portions 14, 18 in a desired orientation (e.g., oblique with respect to one another, such as with the second portion pivoted 180 degrees about the hinge 22).

The first portion 14 is substantially planar and includes first apertures 26 aligned proximate the hinge 22. In the illustrated embodiment, the first apertures 26 are substantially circular in shape, and each first aperture 26 has approximately the same diameter. The first portion 14 also includes second apertures or fastening apertures 30. Each fastening aperture 30 includes a larger diameter and a smaller diameter (e.g., a keyhole shape) that can receive and retain an associated fastening member 32 (e.g., a threaded screw—FIG. 3). In the illustrated embodiment, the first apertures 26 are disposed between the fastening apertures 30 and the hinge 22, and the fastening apertures 30 are disposed at a periphery of the first portion 14.

In the illustrated embodiment, the second portion 18 includes a connecting portion 20, and first tabs 34 and second tabs 38 positioned at a periphery or distal end of the second portion 18 opposite of the hinge 22. In the illustrated embodiment, holes 42 are disposed at a proximal end of the first and second tabs 34, 38, and the holes 42 may represent perforations and allow each first tab 34 and second tab 38 to independently move (e.g., bend) above the holes 42. Each tab 34, 38 may move toward the hinge 22 about the holes 42. In the illustrated embodiment, the first tabs 34 include C-shaped tabs 34a and T-shaped tabs 34b. The C-shaped tabs 34a and the T-shaped tabs 34b are arranged in alternating order. The second tabs 38 are substantially linear and positioned between the alternating C-shaped tabs 34a and T-shaped tabs 34b.

The second portion 18 also includes third tabs 46 spaced apart from the first tab 34 and second tab 38. The third tabs 46 are positioned in a middle of the connecting portion 20 and include a free end and a proximal end. In the illustrated embodiment, holes 50 are disposed at a proximal end of the third tabs 46 and may represent perforations allowing each third tab 46 to independently move (e.g., bend) about the holes 50. Each tab 46 may move away from the hinge 22 about the holes 50. In the illustrated embodiment, the third tabs 46 are shaped substantially similarly to the second tabs 38.

Figure 2:
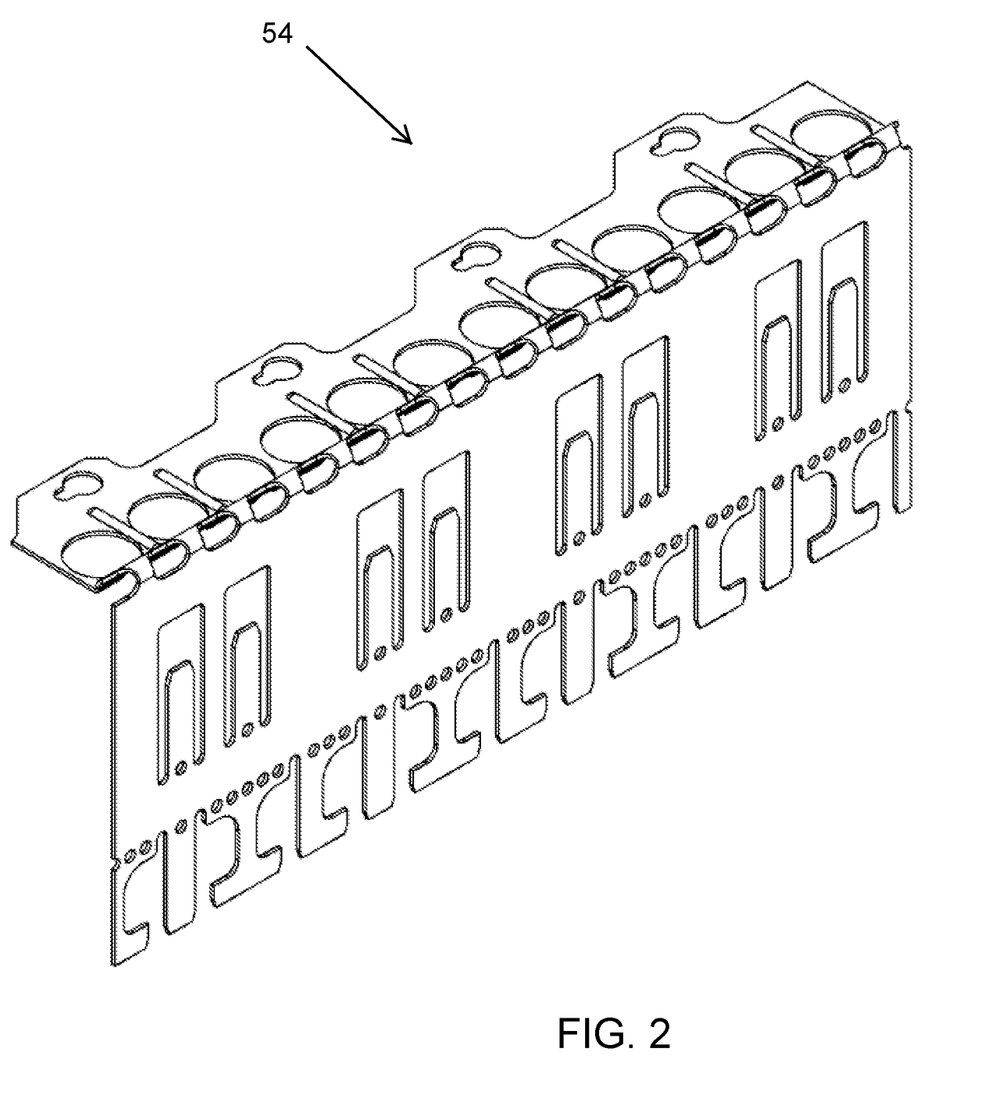
FIG. 2 is a perspective view of a bracket of another embodiment.

In the illustrated embodiment, the bracket 10 is formed with nine first apertures 26 and three pairs of third tabs 46. In other embodiments, as shown in FIG. 2, a bracket 54 may be formed to include a different length (e.g., the bracket 54 includes twelve first apertures 26 and is wider than the bracket 10). Both brackets 10, 54 may be produced from the same mold, providing a modular design and allowing production to easily change between different lengths of brackets without having to substantially change the mold. Using a common die for different sizes also saves manufacturing costs, and allows either bracket 10, 54 to be made cheaper.

Figure 3:
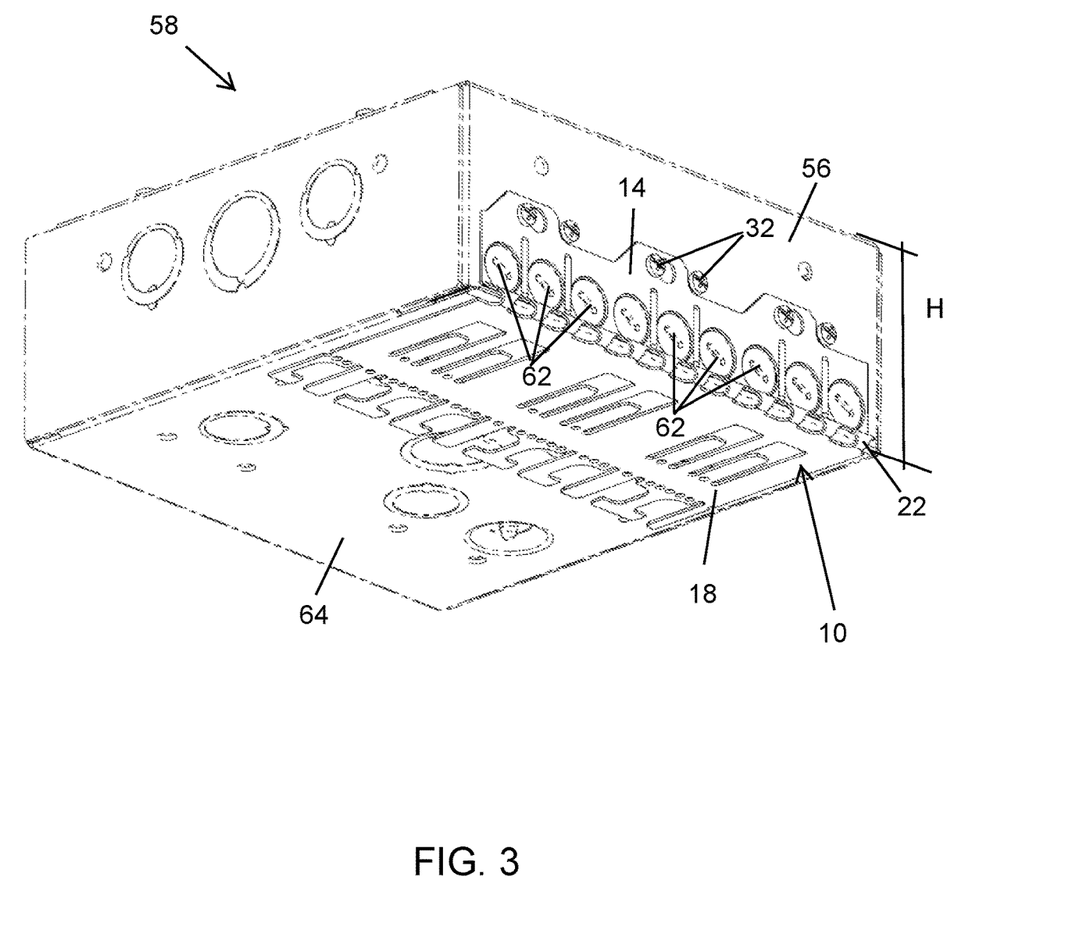
FIG. 3 is a perspective view of the bracket of FIG. 1 coupled to an electrical box.

As shown in FIG. 3, the bracket 10 is coupled to an electrical container or box 58 (e.g., a junction box). Fastening members 32 are inserted through the fastening apertures 30 to removably secure the bracket 10 to a side of the box 58. In the illustrated embodiment, the bracket 10 is secured to a side 56 of the box 58 positioned between an open side 60 (FIG. 5A) and a rear surface 64 opposite the open side 60. The fastening members 32 may be removed to decouple the bracket 10 from the box 58. Each first aperture 26 is aligned with a removable section (e.g., a pry-out or punch-out 62). The punch-outs 62 can be removed from the box 58 in order to provide a passageway to an interior of the box 58. In other embodiments in which the box 58 has a different shape (e.g., non-orthogonal sides), the hinge 22 may be manipulated so that the first and second portions 14, 18 rest against surfaces of the box 58. In other embodiments with a different sized box 58 (e.g., a wider box), a bracket having a different width (e.g., bracket 54) may be used.

While coupled to the box 58, the first portion 14 rests against the side 56 of the box 58, the hinge 22 is positioned proximate an edge of the box 58, and the second portion 18 rests against the rear surface 64 of the box 58. Stated another way, the bracket 10 generally conforms or corresponds to the outer shaped of the box 58, thereby minimizing the amount of space occupied by the bracket 10 and assisting in transporting (e.g., shipping) the bracket 10 while coupled to the box 58.

As shown in FIG. 3, the bracket 10 is coupled to a side of the box 58 and extends around an edge to the rear surface 64. In other words, the bracket 10 does not extend along the full height (or depth) H between the rear surface 64 and the open side 60 (FIG. 5A) of the box 58. Accordingly, the bracket 10 can be used with boxes 58 having various depths.

Figure 4:
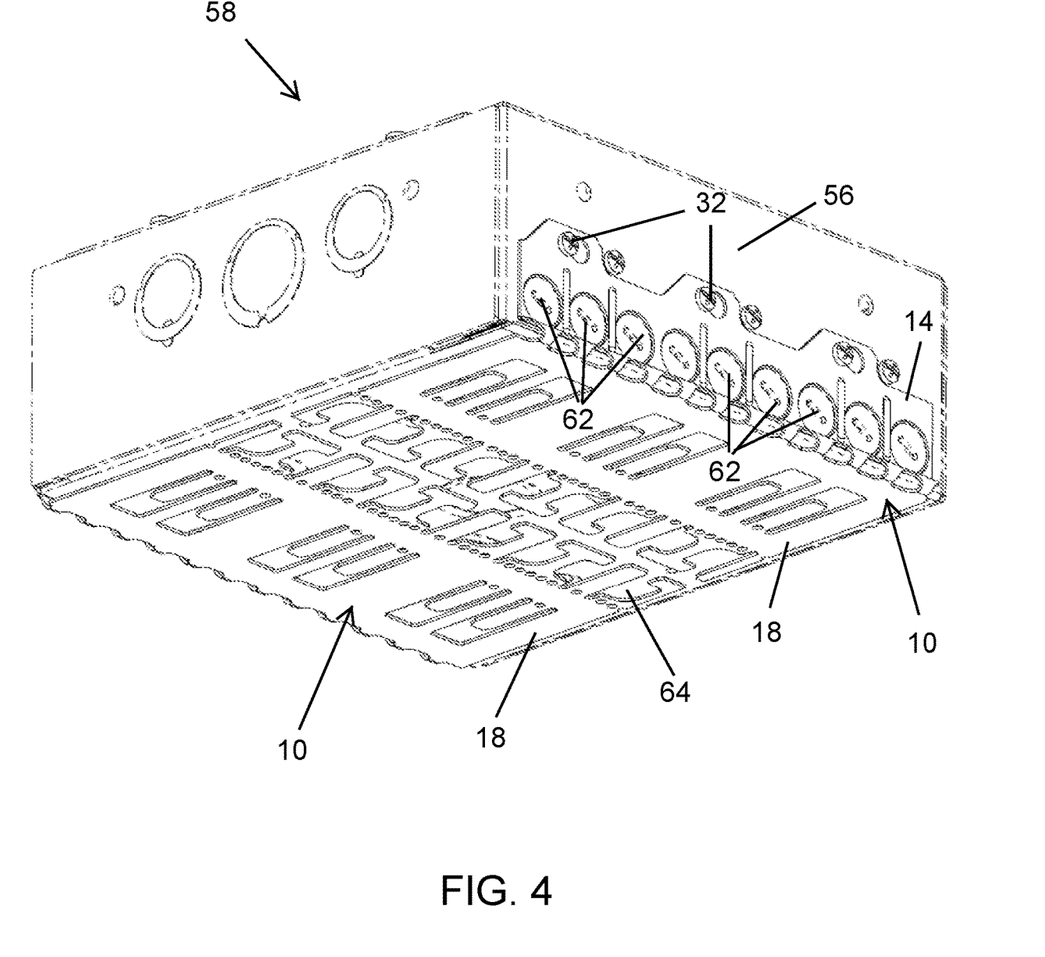
FIG. 4 is a perspective view a pair of brackets of FIG. 1 coupled to the box of FIG. 3.
Figures 5A, 5B:
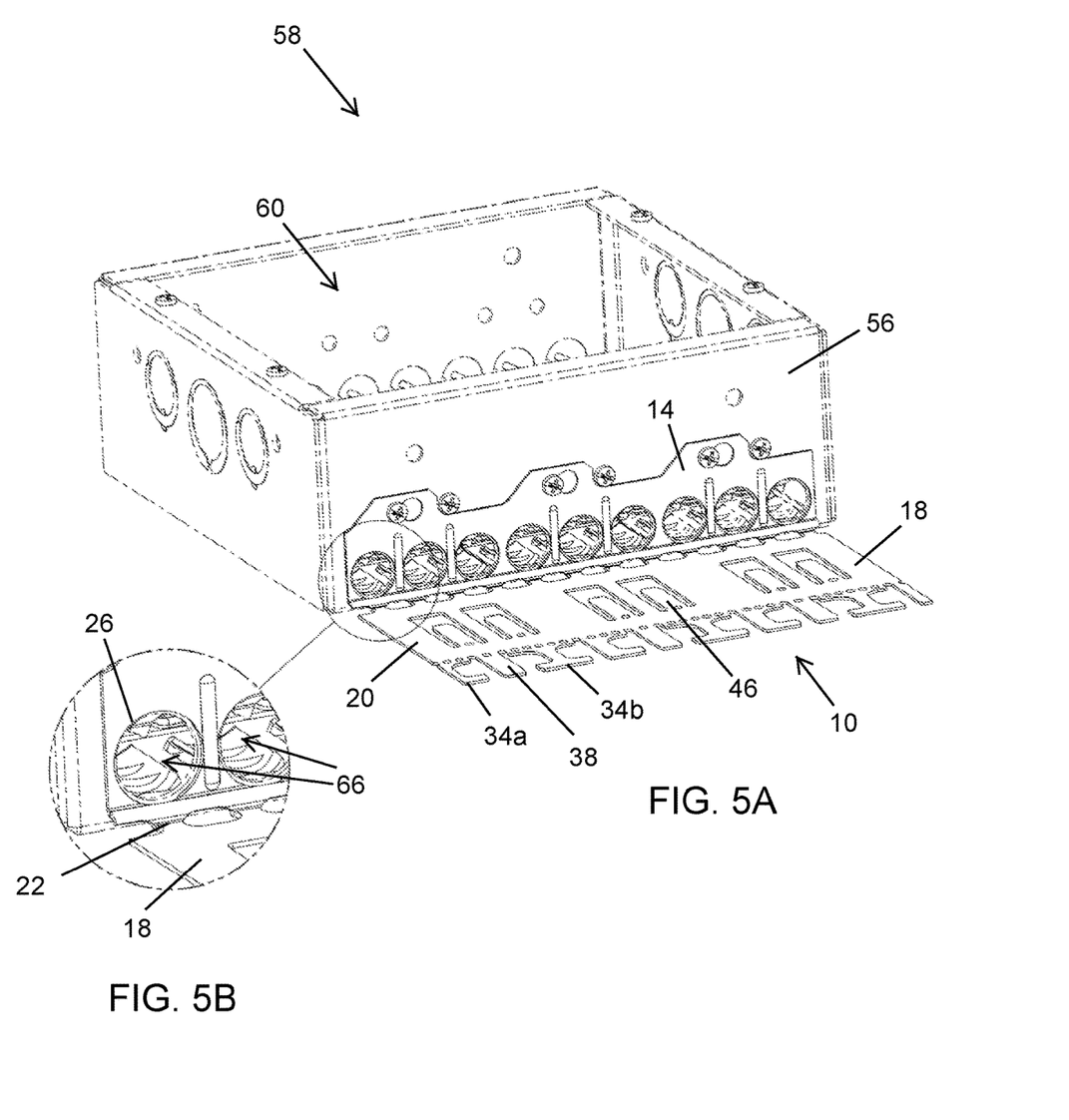
FIG. 5A is a perspective view of the box of FIG. 3, with a second portion of the bracket pivoted relative to a first portion.
FIG. 5B is an enlarged view of a portion of the bracket and box of FIG. 3.

As shown in FIG. 4, a pair of brackets 10 are coupled to the box 58, and the brackets 10 are positioned on opposite sides with the second portions 18 of the brackets 10 positioned along the rear surface 64. The box 58 may have punch-outs 62 on opposite sides, so that each side of the box 58 includes passageways that can align with the first apertures 26 on the respective brackets 10. As shown in FIGS. 5A and 5B, removing the pryouts or punch-outs 62 from the box 58 exposes passageways 66 that are substantially the same size as the first apertures 26. Each first aperture 26 is generally aligned with a respective one of the passageways 66.

As shown in FIG. 5A, the second portion 18 can be pivoted or bent relative to the first portion 14 about the hinge 22. In the illustrated embodiment, the second portion 18 is pivoted toward the first portion 14 and away from the rear surface 64 of the box 58. Bending the second portion 18 may overcome any initial bias in the hinge 22, and the hinge 22 retains the second portion 18 in the new, bent position. In the illustrated embodiment, the second portion is bent approximately 180° and remains approximately orthogonal with respect to the first portion 14.

Figures 6A, 6B:
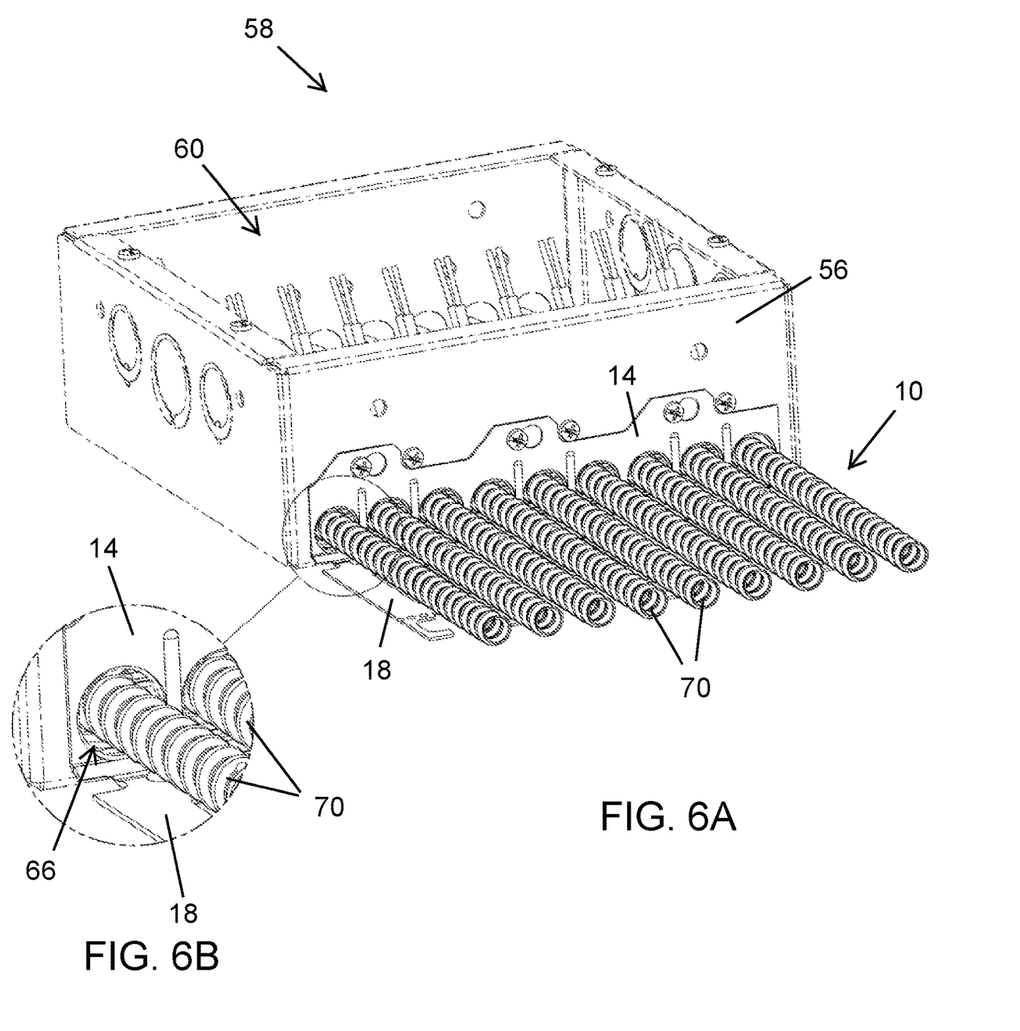
FIG. 6A is a perspective view of the box of FIG. 5A with electrical conductors extending through the bracket and into the box.
FIG. 6B is an enlarged view of a portion of the bracket and the box of FIG. 6A.

As shown in FIGS. 6A and 6B, electrical conductors 70 (e.g., metal clad (MC) cables) are inserted through the first apertures 26 and passageways 66. Each MC cable 70 extends into an interior of the box 58. In some embodiments, an end of each MC cable may engage a retaining device (not shown), while the remaining length of the MC cable extends beyond the second portion 18 of the bracket 10.

Figures 7A, 7B:
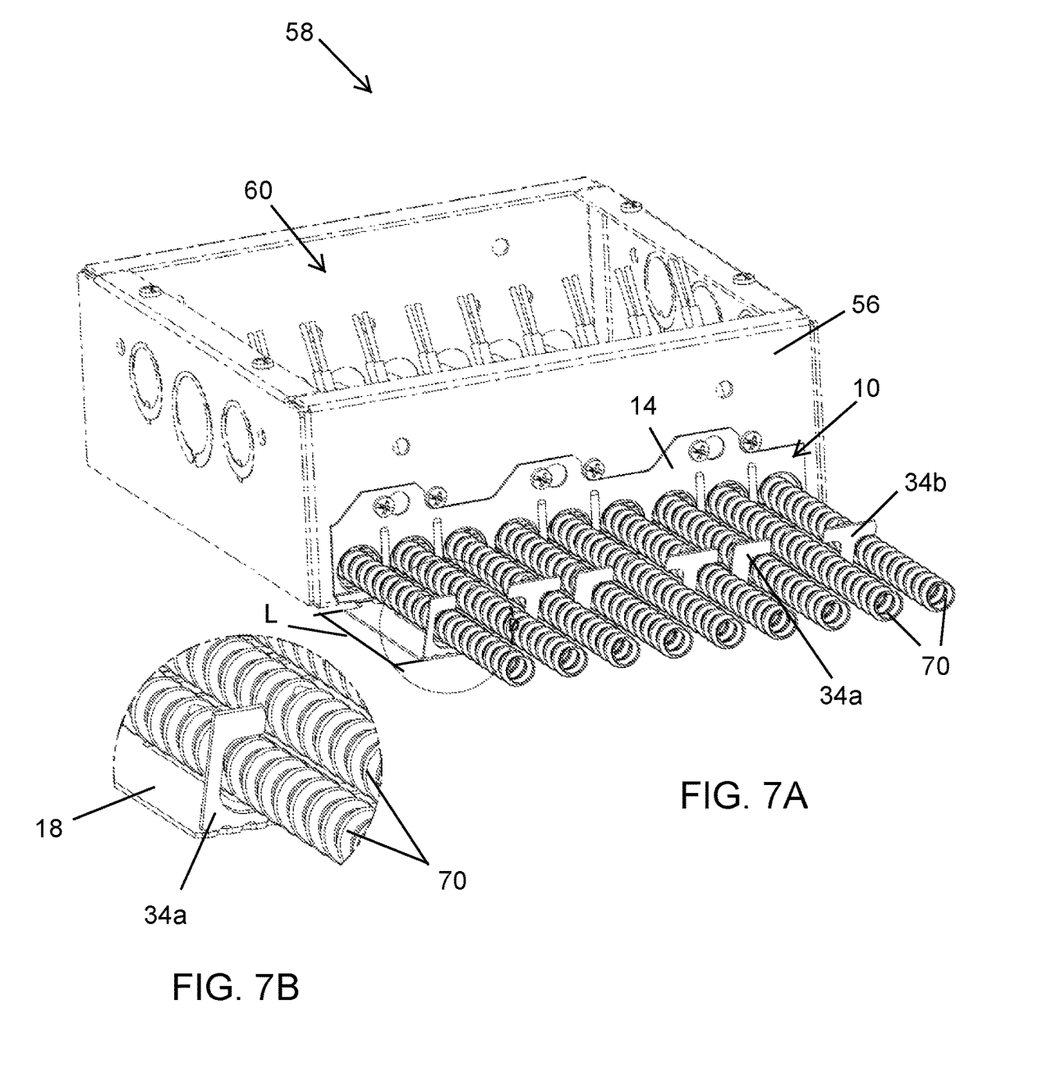
FIG. 7A is a perspective view of the box and bracket of FIG. 3, with first tabs of the bracket pivoted.
FIG. 7B is an enlarged view of a portion of the bracket and the box of FIG. 7A.

As shown in FIGS. 7A and 7B, the first tabs 34a, 34b can be pivoted or bent about the holes 42. The MC cables 70 are spaced in order to allow the first tabs 34a, 34b to be positioned between adjacent MC cables 70. In the illustrated embodiment, the first tabs 34a, 34b pivot approximately 90° about the holes 42. In some embodiments the length L between the pivoted first tabs 34a, 34b and the box 58 is less than twelve inches. In some embodiments, the length L between the pivoted first tabs 34a, 34b and the box 58 is approximately six inches. Each C-shaped tab 34a includes a finger that extends partially around one MC cable 70. Each T-shaped tab 34b includes a distal end that extends partially around an outer surface of two MC cables 70. In the illustrated embodiment, each of the first tabs 34a, 34b engages one cable; in other embodiments, at least some of the C-shaped tabs 34a and the T-shaped tabs 34b may engage the same MC cables 70. The first tabs 34a, 34b provide lateral support (e.g., limit lateral movement) for the MC cables 70.

Figures 8A, 8B:
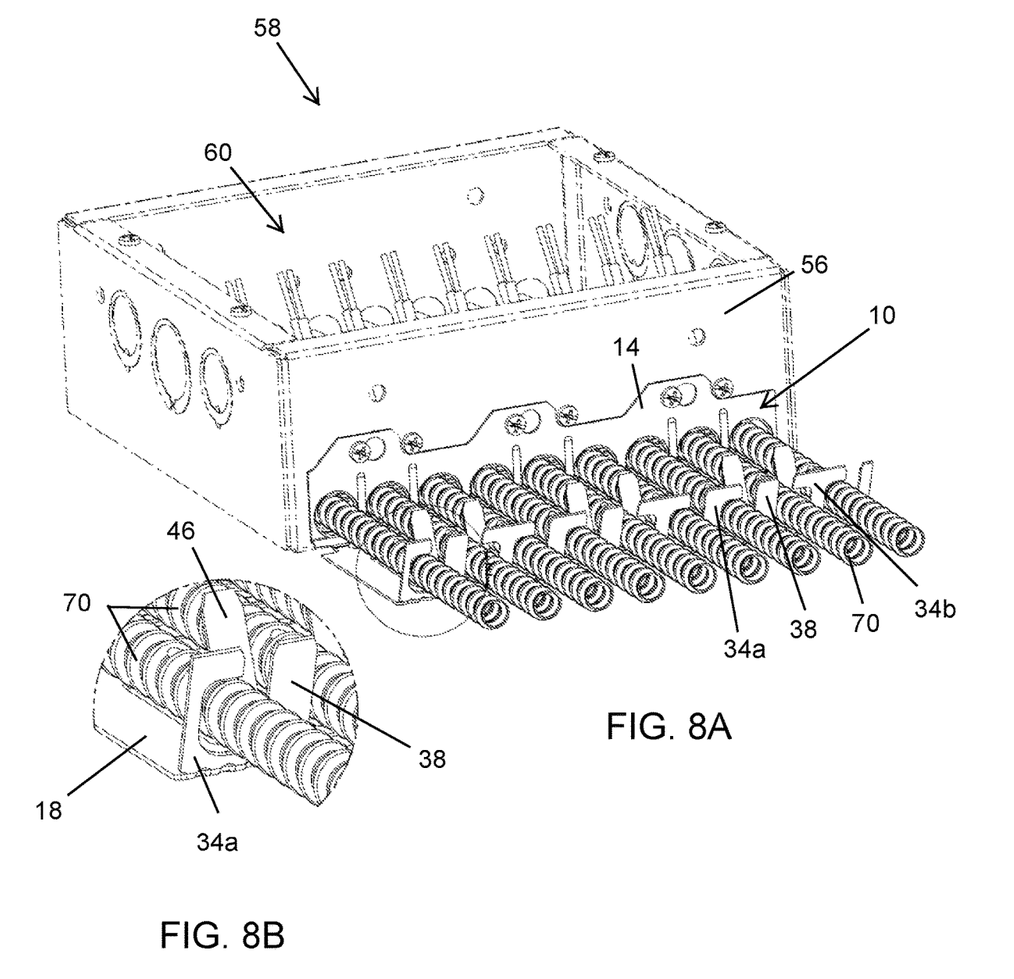
FIG. 8A is a perspective view of the box and bracket of FIG. 7A, with second tabs and third tabs of the bracket pivoted.
FIG. 8B is an enlarged view of the bracket and the box of FIG. 8A.

As shown in FIGS. 8A and 8B, the second tabs 38 and the third tabs 46 are pivoted about the holes 42 and the holes 50, respectively. Each second tab 38 is aligned with an associated third tab 46, which can be pivoted toward one another. In the illustrated embodiment, the second tabs 38 are generally pivoted approximately 90 degrees and are substantially aligned with the first tabs 34a, 34b. In other words, the second tabs 38 are also positioned a length L apart from the box 58. The third tabs 46 can be pivoted or bent less than 90 degrees, although in other embodiments the third tabs 46 may be pivoted to a different angle. In the illustrated embodiment, each cable 70 includes one tab 34, 38 on either side. The tabs 34, 38 limit the translational movement of each cable 70 in a lateral direction. The third tabs 46 serve to further limit the translational movement of each MC cable 70. The second portion 18 and the distal ends of the C-shaped tabs and the T-shaped tabs also limit translational movement in a direction perpendicular to the lateral direction and perpendicular to axis of the cable 70.

Figure 9:
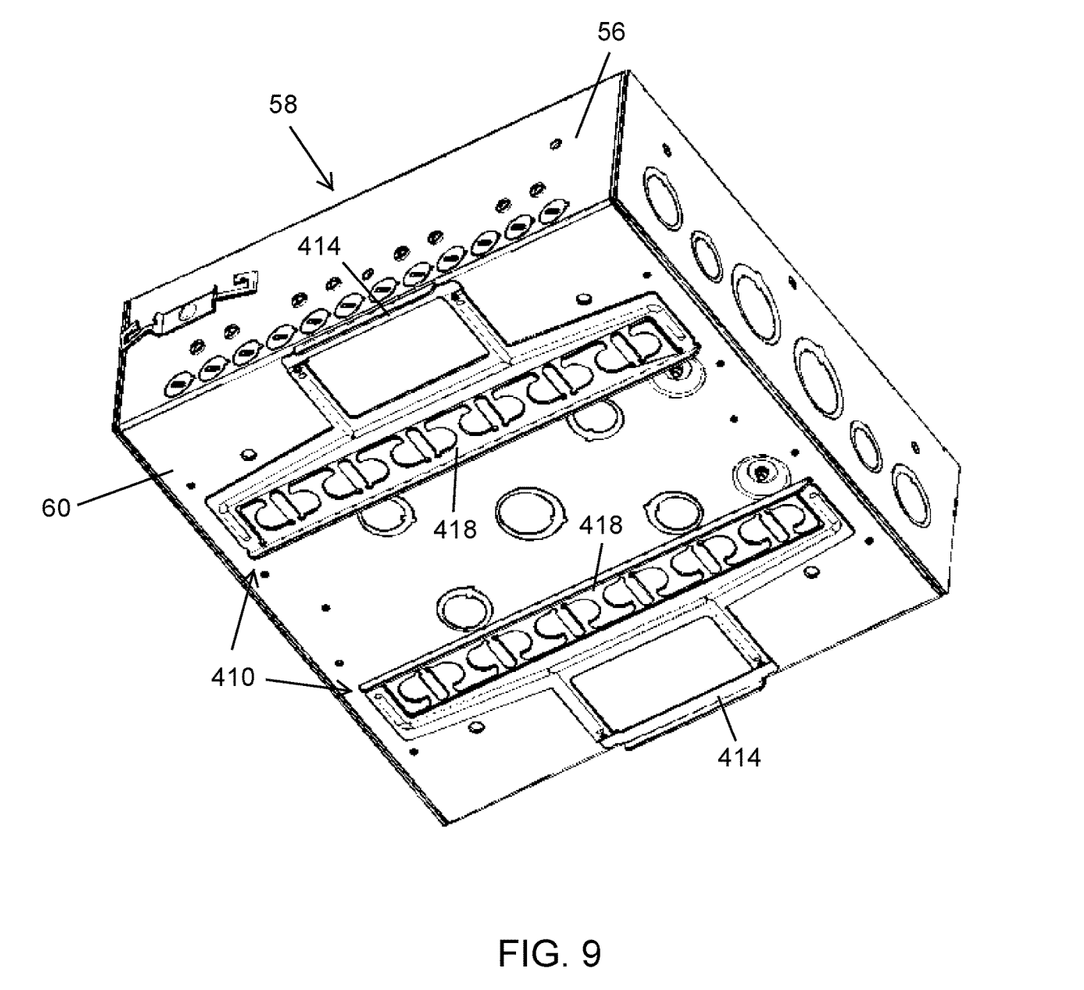
FIG. 9 is a perspective view of a bracket according to another embodiment coupled to an electrical box.

FIG. 9 illustrate a support bracket 410 according to another embodiment. Features of the support bracket 410 that are similar to the bracket 10 described above with respect to FIGS. 1-8 are identified with similar reference numbers, plus 400. Some differences between the support bracket 410 and the support bracket 10 are described herein.

Figure 10:
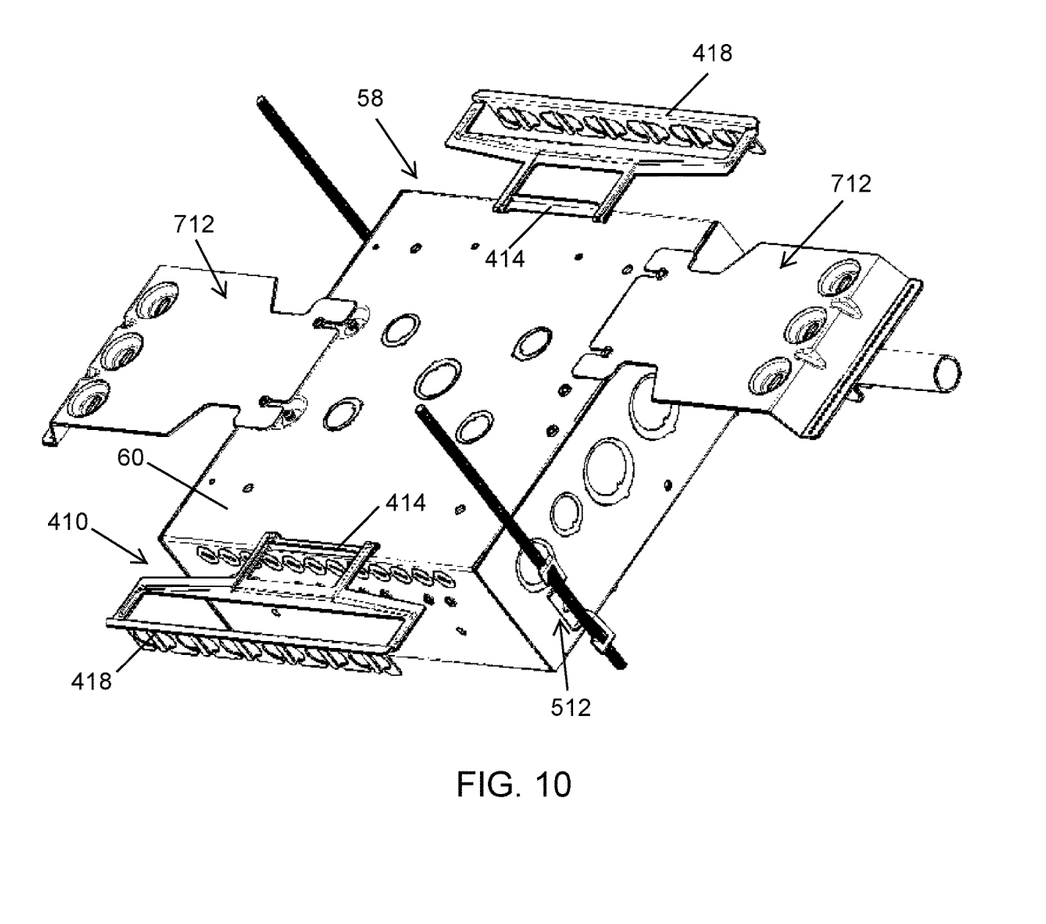
FIG. 10 is a perspective view of the bracket of FIG. 9 with a second portion pivoted relative to a first portion.

As shown in FIG. 9, the support bracket 410 is coupled (e.g., by fasteners) to a surface of the electrical box 58. In the illustrated embodiment, the support bracket 410 is secured to a rear or bottom surface 64 of the box 58 opposite an open side of the box 58, and a first portion 414 of the bracket 410 is positioned adjacent an edge of the rear surface 64. In an initial position, the first position 414 is generally coplanar with a second portion 418. As shown in FIG. 10, a second portion 418 of the bracket 410 can be pivoted relative to the first portion 414.

Figure 11:
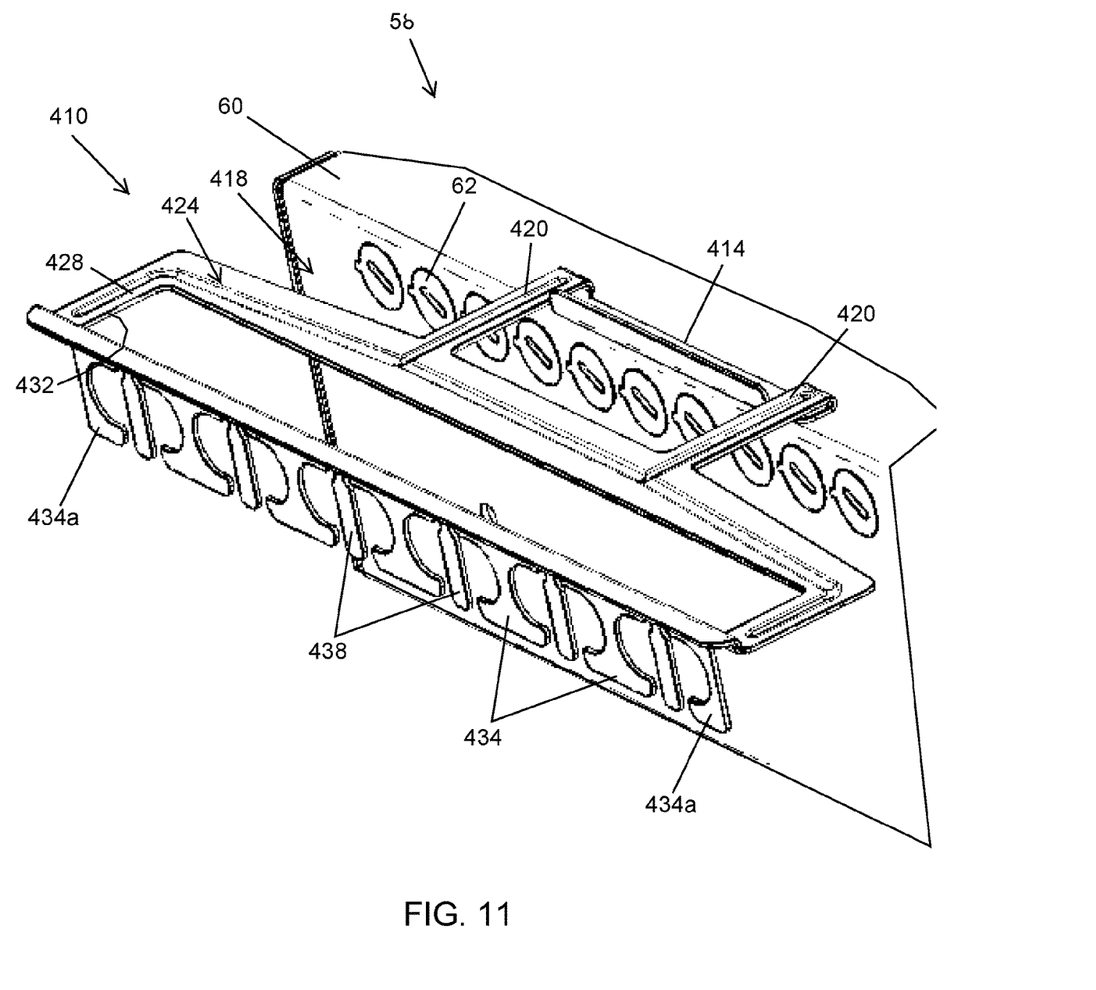
FIG. 11 is an enlarged perspective view of the bracket of FIG. 10.

As best shown in FIG. 11, the second portion 418 includes a pair of legs 420 coupled to the first portion 414 and a flange 424 connected to distal ends of the legs 420. In the illustrated embodiment, the legs 420 are connected to a center portion of the flange 424, and the sides of the flange extend laterally beyond the legs 420. In the illustrated embodiment, the flange 424 includes a rectangular support portion 428 extending around an elongated opening 432, and a plurality of tabs 434, 438 are connected to the support portion 428 and positioned in the elongated opening 432. The tabs 434, 438 can be pivotally connected along one inner edge of the support portion 428. In the illustrated embodiment, the tabs 434 include linear tabs 438 and T-shaped tabs 434, positioned in alternating order. The tabs 434, 438 are pivoted away from the elongated opening 432 about the inner edge to generally align spaces formed between the tabs 434 with passageways formed in the side of the box 58 (e.g., when a punch-out or pryout 62 is removed). The T-shaped tabs 434 are positioned between two cables (similar to FIG. 7A), and the distal ends of the T-shaped tabs 434 extend partially around an outer surface of the cables. The linear tabs 438 are positioned between two adjacent cables. In the illustrated embodiment, the outermost tabs 434a positioned at the sides of the opening 432 are C-shaped.

As best shown in FIG. 11, in the illustrated embodiment the first portion 414 includes a first bend extending along a terminal edge, and the flange 424 includes a second bend extending along a terminal edge. The first bend and the second bend provide improved rigidity for the first portion 414 and the second portion 418. In additional the support portion 428 includes a rib extending partially around the elongated opening 432.

Figure 12:
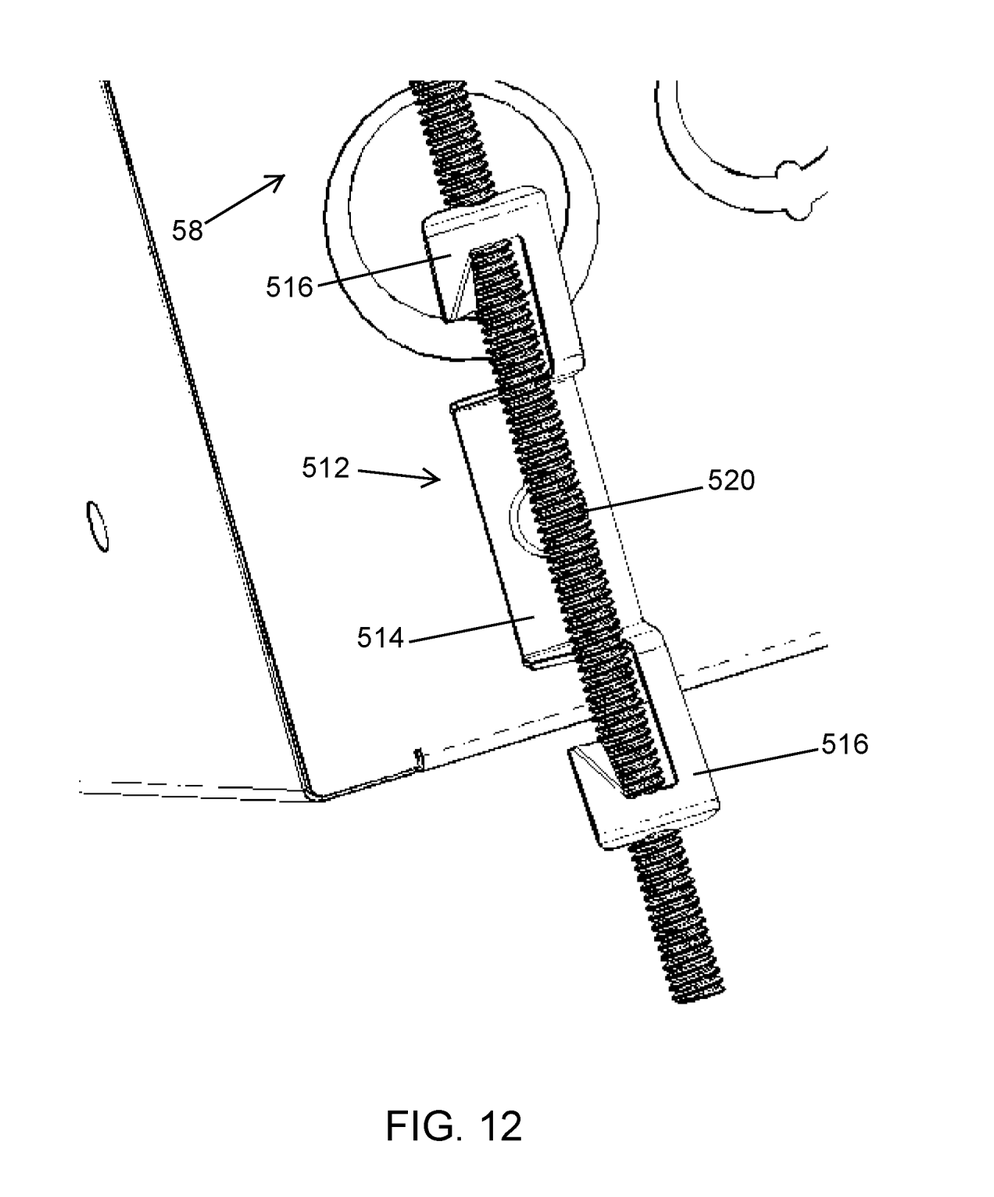
FIG. 12 is a perspective view of another bracket coupled to the box.

FIG. 12 illustrated another bracket 512 coupled to a side of the box 58 and engaging an elongated member 520 (e.g., a shaft or cable). In the illustrated embodiment, the bracket 512 includes a planar portion 514 secured to the side of the box 58 and a pair of fingers 516 protruding, each of which protrudes from a side of the planar portion 514. Each of the fingers 516 has a C-shaped profile and is configured to extend around a portion of the elongated member 520.

Figure 13:
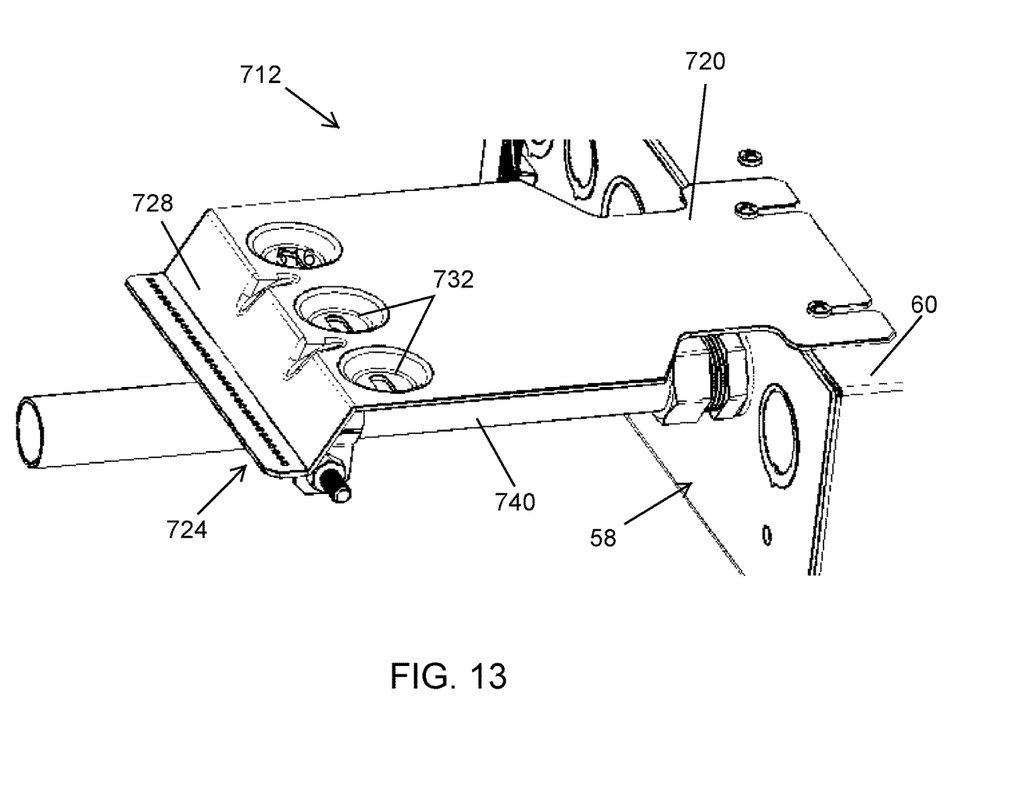
FIG. 13 is a perspective view of another bracket coupled to the box.
Figure 14:
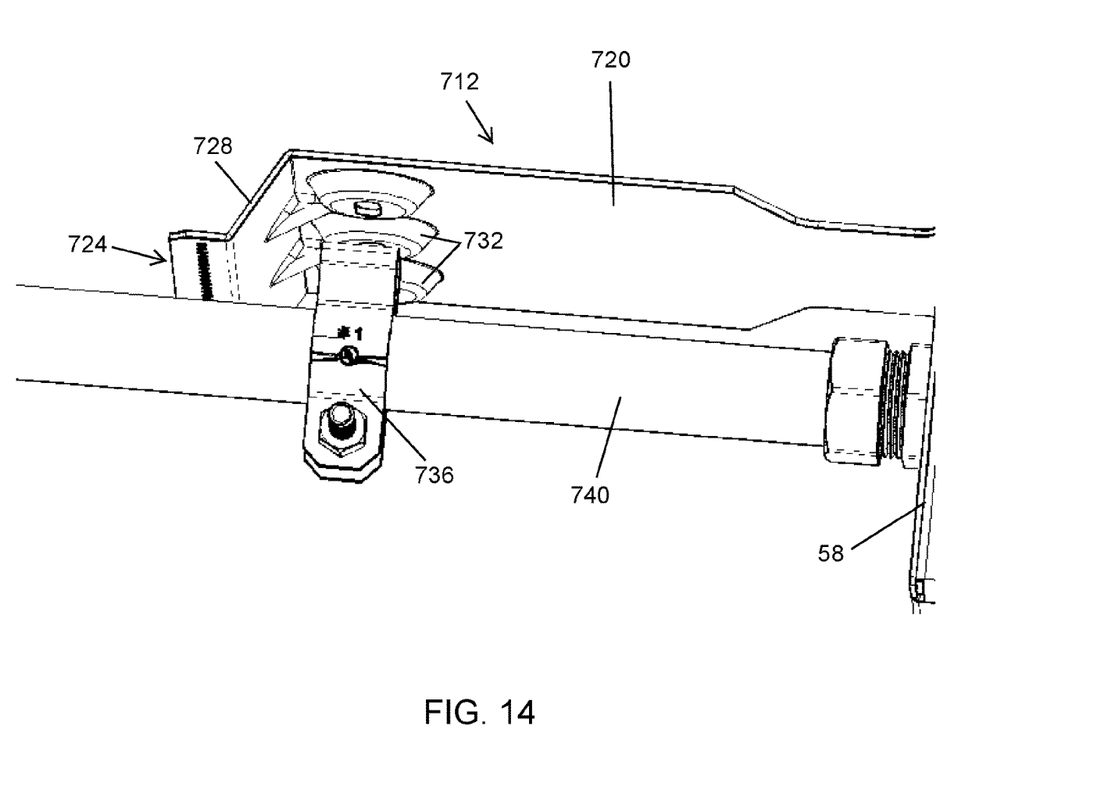
FIG. 14 is another perspective view of the bracket of FIG. 13.

FIGS. 13 and 14 illustrate another bracket 712. The bracket 712 includes a planar portion 720 having a proximal end 722 coupled to a rear wall 64 of the box 58 (e.g., by fasteners). A distal end 724 of the bracket 712 includes a flange 728 oriented obliquely relative to the planar portion 720. In the illustrated embodiment, the bracket 712 includes openings 732. Each opening 732 is configured to support a retention device (e.g., a clip 736) that can engage a conduit 740.

Although certain aspects have been described in detail with reference to certain preferred embodiments, variations and modifications exist within the scope and spirit of one or more independent aspects as described.

What is claimed is:

1. A bracket for supporting an electrical conductor extending through an aperture of an electrical box, the bracket comprising:
    a first portion configured to be coupled to an outer surface of the electrical box, the first portion including a plurality of first apertures configured to align with apertures on the electrical box and receive a conductor extending into the electrical box; and
    a second portion coupled to the first portion and pivotable relative to the first portion, the second portion including a connecting portion and a plurality of tabs, the plurality of tabs being pivotable relative to the connecting portion.

2. The bracket of claim 1, wherein the second portion further includes a living hinge disposed between the connecting portion and the tabs, the living hinge allowing the tabs to pivot relative to the connecting portion.

3. The bracket of claim 1, wherein the plurality of tabs includes a plurality of first tabs, each of the first tabs having a distal end configured to extend at least partially around an outer surface of the conductor.

4. The bracket of claim 3, wherein the plurality of tabs includes a plurality of second tabs, each of the second tabs positioned between two adjacent first tabs.

5. The bracket of claim 4, wherein the plurality of tabs includes a plurality of linear tabs pivotable relative to the connecting portion in an opposite direction than the second tabs and positioned between two adjacent conductors.

6. The bracket of claim 1, further comprising an intermediate portion coupling the second portion for pivotable movement relative to the first portion.

7. The bracket of claim 1, wherein the second portion further includes a plurality of holes disposed between the connecting portion and each of the plurality of tabs, the plurality of holes allowing each tab to pivot relative to the connecting portion.

8. The bracket of claim 1, wherein the plurality of tabs include a first C-shaped tab, a first linear tab positioned adjacent the first C-shaped tab, a first T-shaped tab positioned adjacent the linear tab, and a second C-shaped tab positioned adjacent the first T-shaped tab.

9. The bracket of claim 8, wherein the second portion further includes an elongated opening extending through the flange, the plurality of tabs are connected to an inner edge of the elongated opening and are pivotable relative to the inner edge.

10. The bracket of claim 8, wherein the plurality of tabs includes a plurality of first tabs, each of the first tabs having a distal end configured to extend at least partially around an outer surface of at least one of the conductors.

11. The bracket of claim 10, wherein the plurality of tabs includes a plurality of second tabs, each of the second tabs positioned between two adjacent first tabs.

12. The bracket of claim 1, wherein the plurality of first tabs includes a first C-shaped tab, a second C-shaped tab, and a T-shaped tab with two ends extending in opposite directions from one another, each of the two ends configured to engage an outer surface of an associated one of the conductors.

13. The bracket of claim 1, wherein the plurality of tabs define a plurality of spaces, each of the spaces configured to receive a conductor, each of the spaces configured to be substantially aligned with an opening in a side of an electrical box.

14. The bracket of claim 1, wherein at least one of the first portion and the second portion includes a support bend positioned adjacent a terminal edge.

15. A bracket for supporting an electrical conductor extending through an aperture of an electrical box, the bracket comprising:
    a first portion configured to be coupled to an outer surface of the electrical box; and
    a second portion coupled to the first portion and pivotable relative to the first portion, the second portion including a flange, at least one leg pivotally coupling the flange to the first portion,
    wherein the flange includes a rectangular support portion extending around an elongated opening and a plurality of tabs moveably connected to the support portion, and
    wherein the plurality of tabs are connected to the support portion in a cantilevered manner and extending into the elongated opening in an unstressed position.

16. The bracket of claim 15, wherein the plurality of tabs are connected to an inner edge of the elongated opening and are pivotable relative to the inner edge.

17. The bracket of claim 15, wherein the plurality of tabs includes a plurality of first tabs, each of the first tabs having a distal end configured to extend at least partially around an outer surface a conductors.

18. The bracket of claim 17, wherein the plurality of tabs includes a plurality of second tabs, each of the second tabs having a linear shape and positioned between two adjacent first tabs.

19. The bracket of claim 15, wherein the plurality of tabs includes at least one tab having a T-shape with two ends extending in opposite directions from one another, each of the two ends engaging an outer surface of an associated one of the conductors.

20. The bracket of claim 15, wherein at least one of the first portion and the second portion includes a support bend positioned adjacent a terminal edge.

* * * * *